United States Patent [19]

Gresock et al.

[11] Patent Number: 4,583,295
[45] Date of Patent: Apr. 22, 1986

[54] SPLINE GAUGING APPARATUS

[75] Inventors: Joseph A. Gresock, 9296 Perry Rd., Atlas, Mich. 48411; Anthony A. Sulfaro, Flushing, Mich.

[73] Assignee: Joseph A. Gresock, Atlas, Mich.

[21] Appl. No.: 721,584

[22] Filed: Apr. 10, 1985

[51] Int. Cl.$^4$ .............................................. G01B 5/12
[52] U.S. Cl. ................................. 33/179.5 R; 33/555; 33/573
[58] Field of Search .................. 33/179.5 R, 179.5 B, 33/179.5 E, 549, 555, 568, 569, 570, 573

[56] References Cited

U.S. PATENT DOCUMENTS

| 2,735,189 | 2/1956 | Bjornberg | 33/179.5 B |
| 3,069,779 | 12/1962 | Bauer et al. | 33/179.5 R |
| 3,469,321 | 9/1969 | Riddell | 33/179.5 R |
| 4,457,074 | 7/1984 | Golder | 33/179.5 D |
| 4,517,743 | 5/1985 | Och | 33/179.5 R |
| 4,519,241 | 5/1985 | Hofler | 33/179.5 R |

Primary Examiner—William D. Martin, Jr.
Attorney, Agent, or Firm—Barnes, Kisselle, Raisch, Choate, Whittemore & Hulbert

[57] ABSTRACT

An apparatus for automatically engaging and measuring a spline of a workpiece with a gauge having first and second relatively rotatable sensing elements. The elements are rotatable to a first axially aligned position for insertion into grooves between adjacent teeth of the spline and to a second angularly displaced position to bear on opposed faces of adjacent teeth to clamp the spline in the gauge and measure the spline. The gauge elements are inserted in the grooves by moving the gauge and workpiece together with a lost motion to bear on each other adjacent an end of the spline and then rotating the gauge to align the elements with and start them into the grooves. Thereafter the elements are axially advanced fully into the grooves and then rotated to their second position. To measure any eccentricity between the axis of the spline and a generally coaxial circular surface of the workpiece, a probe yieldably contacts a portion of the surface when the workpiece is rotated while clamped and carried by the gauge.

23 Claims, 7 Drawing Figures

SPLINE GAUGING APPARATUS

FIELD OF THE INVENTION

This invention relates to gauging and more particularly to an apparatus for automatically measuring the size of splines.

BACKGROUND OF THE INVENTION

Many workpieces have internal or external splines and are usually designed to mate or slidably interfit with complementary external or internal splines on another workpiece. In many manufacturing and assembly operations, and particularly automated operations, it is necessary to accurately measure the splines of many workpieces of the same nominal size. The spline is usually measured by gauges which measure either the pitch diameter of the spline or the thickness of a tooth or teeth of the spline.

Even in mass production operations, the splines have been measured by gauges which are manually held and manipulated. The gauge and spline are manually held and manipulated because of difficulty in aligning and inserting the spline in the gauge and the great likelihood of damaging the spline and/or the guage if they are improperly aligned or jammed together. In many manufacturing operations, the exact size of the spline is not measured and it is merely determined whether the spline size is within predetermined limits by utilizng both a "go" gauge and a separate "no go" gauge for each spline of each workpiece. This requires the manual operations of inserting and removing two gauges for each workpiece.

In other applications, the size of the spline is measured by a manual gauge which has at least two sensing elements which are inserted in a groove between adjacent teeth of the spline and then relatively rotated to bear on portions of the opposed side faces of the teeth defining the groove. These gauges can be constructed to measure either the actual size or the effective size of the spline. For measuring the effective size, the elements are arranged in a full circle and project into all of the grooves of the spline, and hence provide a measurement of the size of the spline under operating conditions in which it mates with a complementary spline of another workpiece. When constructed to measure the actual size of the spline, the elements of the gauge project into only a few essentially diametrically opposed grooves of the spline and engage only a few of its essentially diametrically opposed teeth.

SUMMARY OF THE INVENTION

In accordance with this invention, an apparatus automatically aligns and engages a gauge with an internal or external spline of a workpiece and measures the spline. The gauge is generally axially aligned with the spline of the workpiece and yieldably urged into contact with the workpiece adjacent an end of the spline. To align the sensing elements of the gauge it is rotated with respect to the workpiece so that its sensing elements become aligned with and start to enter the grooves between the teeth of the spline. The sensing elements are advanced into the grooves and then rotated to bear on portions of the opposed faces of the teeth to provide an indication of the size of the spline. Preferably, to improve the accuracy of the measurement, the workpiece is carried only by the sensing elements of the gauge when the measurement is made. This can be accomplished by disengaging from the workpiece any locator utilized to initially position the workpiece for engagement by the gauge.

If desired, the apparatus can also measure any eccentricity of a circular surface of the workpiece with respect to the axis of the spline. This eccentricity can be measured by a probe yieldably bearing on the surface while rotating the workpiece relative to the probe with the workpiece carried by the gauge.

Objects, features and advantages of this invention are to provide an apparatus which automatically engages and measures the spline of a workpiece without any damage or injury to the spline or the gauging elements contacting the workpiece, can measure a large number of workpieces per unit of time, has improved accuracy, repeatability and reliability in measuring splines, can be easily and readily adapted to make either effective or actual measurements, can determine the concentricity of surfaces of the workpiece relative to the axis of the spline, is rugged, durable, of economical manufacture and assembly and of relatively simple design, requires little maintenance and has a long useful life in service.

These and other objects, features and advantages of this invention will be apparent from the following detailed description, appended claims and accompanying drawings in which:

DETAILED DESCRIPTION

Figure 1:
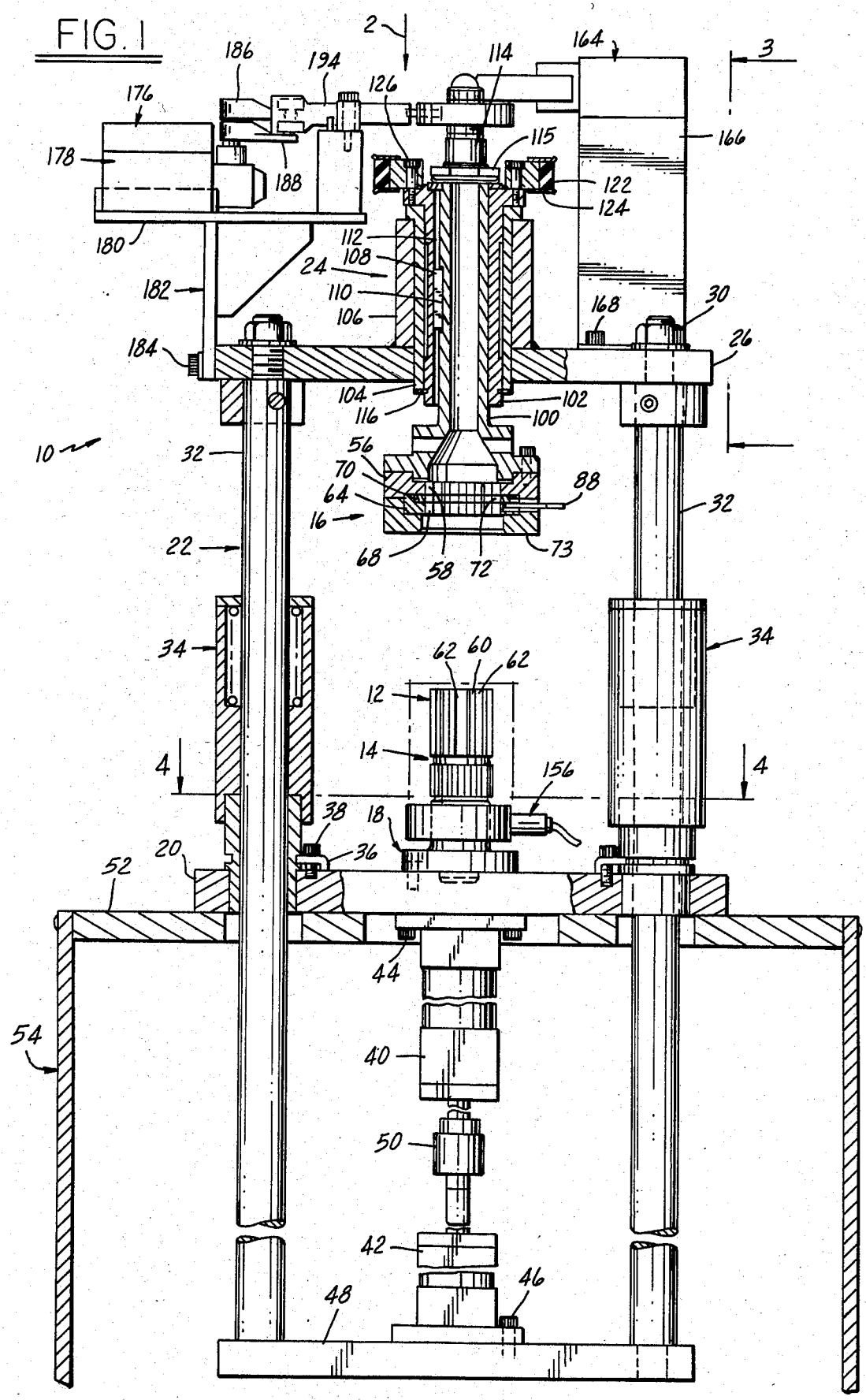
FIG. 1 is a fragmentary sectional view of an apparatus embodying this invention for measuring an external spline of a workpiece.

Referring in more detail to the drawings, FIG. 1 illustrates an apparatus 10 embodying this invention for automatically inserting a spline 12 of a workpiece 14 in a gauge assembly 16 and measuring the spline. The workpiece is received on a locator 18 mounted on a lower platen 20 of a press 22. The gauge 16 is mounted on a head assembly 24 secured to an upper platen 26. The gauge is rotated by a drive assembly 28.

The upper platen 26 of the press is secured by nuts 30 to one end of a pair of guide rods 32 each slidably received in a bearing assembly 34 secured by retainers 36 and cap screws 38 in the lower platen 20. The upper platen and head are raised and lowered with respect to the workpiece by a pair of fluid actuated cylinders 40 and 42 connected together in tandem. The body of the cylinder 40 is secured by cap screws 44 to the lower platen and the body of the lower cylinder 42 is secured by cap screws 46 to a carrier plate 48 to which the lower ends of the guide rods 32 are secured by nuts (not shown). The piston rods of the cylinnders are connected together by a coupling 50. The lower platen 20 of the press is mounted on a top 52 of a base cabinet 54 which usually sits on the floor of a plant.

In accordance with one feature of this invention, to improve the accuracy and repeatability of the measurement of the spline, it is clamped and carried by the gauge assembly so that the workpiece can be disengaged from the locator when the measurement of the spline is made. This is accomplished by utilizing the sensing elements which contact the teeth of the spline for measuring it to also clamp the spline in the gauge. The gauge can be for measuring either the actual or effective size of either external or internal splines.

Figure 6:
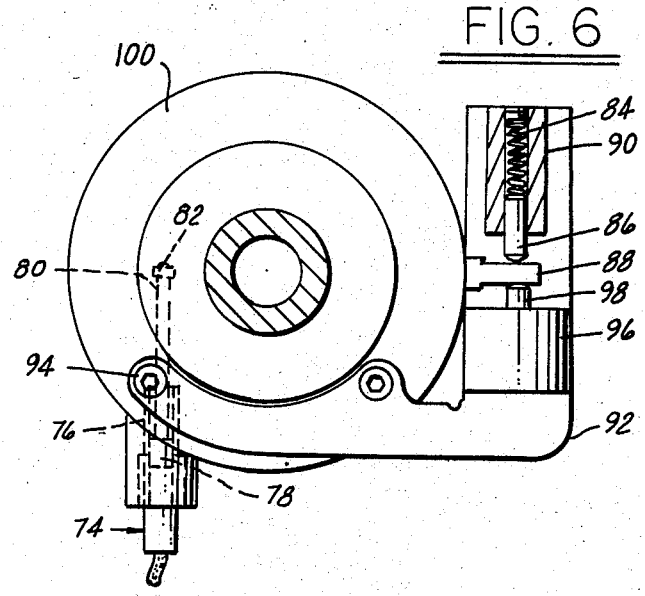
FIG. 6 is a sectional view taken generally on the line 6—6 of FIG. 5.

The gauge 16 shown in FIGS. 1 and 6 is for measuring the effective size of an external spline. This gauge has a body 56 with a central hole having a plurality of circumferentially spaced keys or sensing elements 58 each constructed to project into a groove 60 between adjacent teeth 62 of the spline 12. A retainer ring 64 is secured by cap screws 66 in a counterbore in the body and has a plurality of circumferentially spaced keys or sensing elements 68 each also constructed to project into a groove 60 of the spline and be axially aligned with a corresponding element 58. A carrier ring 70 is journalled for rotation in a counterbore 72 in the retainer 64 and also has a plurality of circumferentially spaced keys or sensing elements 72 each constructed to project into a groove 60 in the spline.

By rotating the carrier ring 70, the angular position of its sensing elements 72 with respect to the aligned and fixed elements 58 and 68 can be shifted from a first position wherein they are aligned therewith to second position wherein they are offset with respect thereto. When in the first position, the gauge can be aligned and axially inserted over the workpiece so that all of the sensing elements can slide generally axially into the grooves 60 of the spline. When the carrier ring 70 is rotated to the second position, its sensing elements 72 bear on a portion of one side face of the teeth 62 of the spline and the sensing elements 58 and 68 are forced into engagement with a portion of the other side face of the teeth of the spline. This both clamps or secures the spline in the gauge so that the workpiece can be carried by the gauge and enables measurement of the spline.

Both the pitch diameter of the spline and the thickness of the teeth of the spline are a function of and can be measured by the extent of the angular displacement of the key elements 72 with respect to the elements 58 and 68. The extent of this displacement is translated into an electric signal by a transducer 74 (FIG. 6) which is preferably a linear variable differential transformer (LVDT). This LVDT has a coil 76 in which an iron slug 78 is moved by an actuator rod 80 which is yieldably biased into engagement with an arm 82 fixed to the carrier ring 70 for movement therewith.

As shown in FIG. 6, the carrier ring 70 is yieldably urged toward its first position by a spring 84 and plunger 86 bearing on an arm 88 fixed to the carrier ring. The spring and plunger are received in a housing 90 secured to a bracket 92 fastened by cap screws 94 to the gauge. The carrier ring can be rotated to its second position against the bias of the spring by a fluid actuated cylinder 96 with a piston rod 98 bearing on the arm 88.

In accordance with another feature of this invention, the sensing elements of the gauge are automatically aligned with and started into the grooves of the spline without jamming or forcing them which would damage the gauge and/or the spline. This is accomplished by yieldably urging the gauge into contact with the workpiece adjacent the outer end of the spline and then turning the gauge so that its elements become aligned with and gently start into the grooves between the teeth of the spline. The head assembly 24 provides a lost motion arrangement which yieldably urges the gauge into engagement with the workpiece while permitting it to be rotated to align the sensing elements with the grooves. As shown in FIG. 1, the head assembly has a carrier shaft 100 slidably received in a quill 102 journalled for rotation in a sleeve bearing 104 mounted in a bearing block 106 fixed to the upper platen 26. So that the shaft 100 will rotate with the quill 102, while still being axially movable, they are connected by an axially extending key 108 received in a pocket 110 in the shaft and in a keyway 112 in the quill. The shaft is retained in the quill by a lock nut 114 and washer 115 adjacent its upper end and the quill is retained in the sleeve bearing by a snap ring 116 adjacent its lower end.

Figure 2:
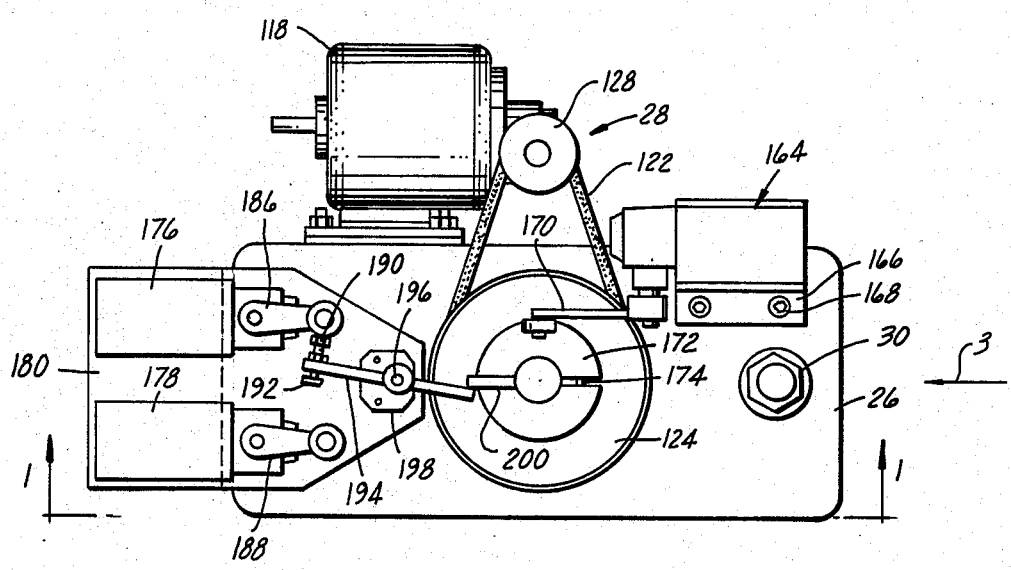
FIG. 2 is a fragmentary top view taken generally in the direction of the arrow 2 of FIG. 1.
Figure 3:
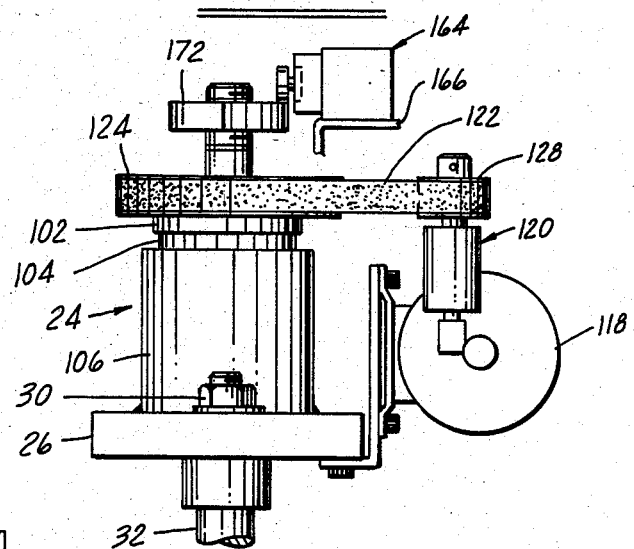
FIG. 3 is a fragmentary side view taken generally along the line 3—3 of FIG. 1.
Figure 4:
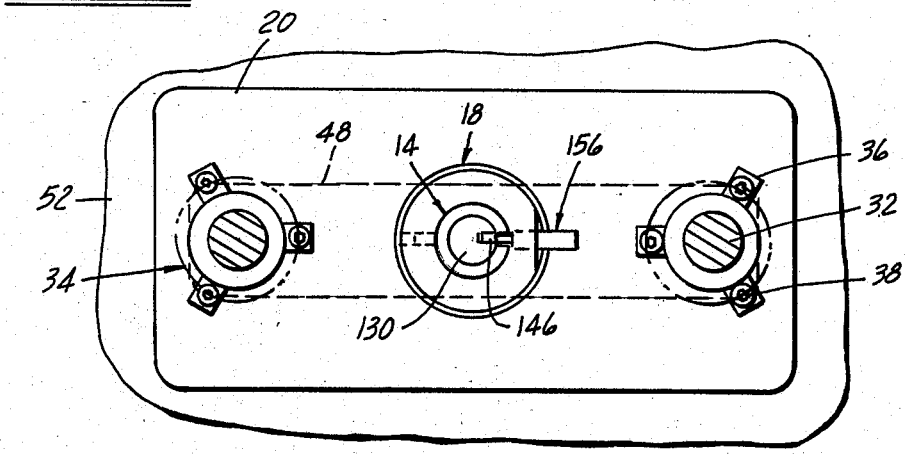
FIG. 4 is a sectional view taken generally along the line 4—4 of FIG. 1.
Figure 5:
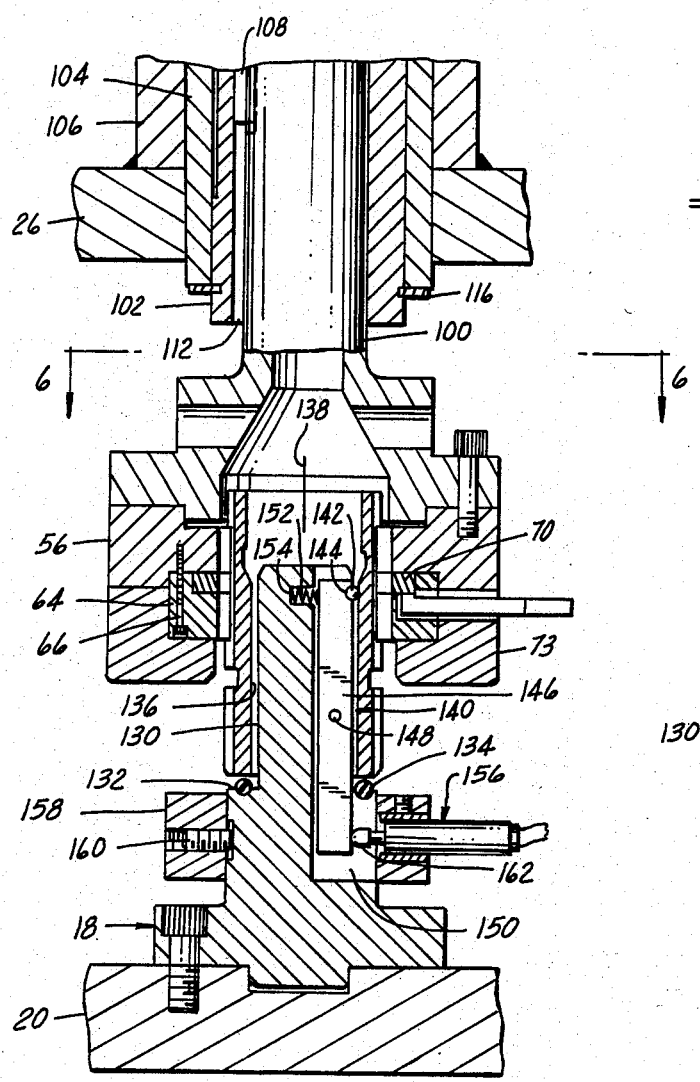
FIG. 5 is an enlarged and fragmentary sectional view of the gauge head and workpiece locator of the apparatus of FIG. 1.
Figure 7:
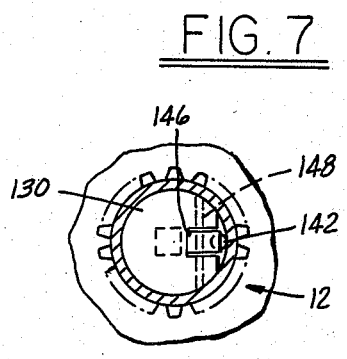
FIG. 7 is a fragmentary sectional view taken generally on line 7—7 of FIG. 5.

As shown in FIGS. 1 and 2, the drive assembly 28 for rotating the gauge has a reversible electric motor 118 connected to the quill 102. Preferably, to insure that the gauge and spline of the workpiece cannot be damaged, the motor is coupled to the quill through a torque limiting slip clutch 120 (FIG. 3). The clutch is connected to the quill by a belt 122 received over a pulley 124 secured by cap screws 126 to the quill and a pulley 128 keyed to the output shaft of the clutch.

Preferably, to increase the accuracy and repeatability of the measurement, the workpiece, while being carried by the gauge, is disengaged from the locator 18 as shown in FIG. 6. This is achieved by constructing the locator so that when the workpiece is raised slightly it is disengaged from the locator. To do so, the locator has a pilot 130 with a smaller diameter than the smallest internal diameter of the workpiece and a shoulder 132 supporting the bottom of the workpiece. To insure that the workpiece does not rotate with the head when the gauge is rotated to align its sensing elements with the grooves of the spline, the workpiece frictionally engages an O-ring 134 received in a groove in the underlying shoulder 132. If desired, in lieu of this O-ring, rotation of the workpiece can be restrained or prevented by a clamping mechanism, expanding mandrel, positive stop or other device which can be released and disengaged from the workpiece when it is carried by the head.

In accordance with a further feature of this invention, the concentricity or eccentricity of a circular surface of the workpiece with respect to the effective axis of the spline can also be measured or determined. For example, the eccentricity of the internal cylindrical 136 surface of the workpiece with respect to the effective axis 138 of the spline 12 can be determined. As shown in FIG. 6, this is accomplished by a radially yieldable probe assembly 140 contacting a point on the surface while the workpiece, when clamped and carried by the gauge 16, is rotated at least one complete revolution by the drive assembly 28.

To provide essentially a point contact with the surface, the probe assembly has a contact sphere 142 which is received in pocket 144 in one end of a lever arm 146. The arm is pivotally mounted by a pin 148 in a clearance recess 150 in the pilot of the locator 18. The ball is yieldably urged generally radially outward into engagement with the surface by a spring 152 received in a pocket 154 in the pilot and bearing on the arm. The generally radial movement of the ball and hence pivotal movement of the arm is translated into an electric signal by a transducer 156 which is preferably an LVDT. The transducer is mounted in a carrier ring 158 received on and secured by a set screw 160 to the body of the locator. The transducer has a coil in which an iron slug is moved by an actuator rod 163 which is yieldably urged by a spring (not shown) into engagement with the lever arm 146.

The gauging apparatus 10 is cycled and controlled by appropriate electric, electronic, pneumatic and/or hydraulic circuitry (not shown). Through the control circuitry, the axial position of the gauge relative to the upper platen 26 of the press is sensed by the change of state of a limit switch 164 which is mounted on a bracket 166 secured by cap screws 168 to the upper platen. The arm 170 of the limit switch is actuated by a dog ring 172 secured by cap screws 174 to the upper end of the carrier shaft 100 for the gauge. For use in controlling the motor 118 to rotate the gauge, an indication of its angular position is provided by a change of state of limit switches 176 and 178 which are mounted on a base plate 180 of a bracket 182 secured by cap screws 184 to the upper platen of the press. Arms 186 and 188 of the limit switches are axially offset and actuated by adjustable dogs 190 and 192 mounted on one end of a lever arm 194 which is pivotally mounted at 196 on a support 198 carried by the bracket. The lever arm is actuated by a cam plate 200 secured to the ring 172 for rotation with the shaft 100 carrying the gauge.

Preferably, the output of gauge LVDT 74 is supplied through an analog to digital converter to a digital programmable controller or central processing unit to facilitate measurement of the spline and setup of the apparatus for measuring a spline. Preferably, the high and low limits to be measured by the apparatus are set up for a specific run of workpieces by inserting high and low limit masters in the gauge 16 to calibrate and store in the processor the high and low limit signals produced by the LVDT 74. Since the output of the LVDT is linear, the central processing unit can be readily programmed to produce a linear interpolation between the high and low limit valves which is an accurate measurement of the size of a spline of any given workpiece inserted in the gauge. With this arrangement, an accuracy and repeatability in measurement of the spline size within 0.0001 of an inch can be achieved. If desired, the numerical value of the measurement for each workpiece can be displayed by suitable displays such as liquid crystal displays (LCD) and/or utilized to provide an indication that the specific workpiece is either within or outside of a predetermined tolerance, range or limits.

Similarly, the output signal of the concentricity LVDT 156 is preferably also supplied through an analog to digital converter to the central processing unit to provide a highly accurate and repeatable measurement of any eccentricity of a circular surface on the workpiece relative to the effective axis of the spline. The output of the LVDT can be calibrated by an appropriate set of high and low limit masters which are received and clamped in the gauge which is lowered sufficiently so that the masters are inserted over the locator 18 and engage the contact ball 142 of the probe assembly 140. If desired, the processing unit can be programmed to correct or compensate for any eccentricity produced by the head assembly 24 and gauge 16 by providing a constant offset or deduction equal to twice this eccentricity from the measured value of the eccentricity of the workpiece. With this arrangement, an accuracy and repeatability of 0.0001 of an inch can be obtained in the measurement of an eccentricity of a circular surface of the workpiece relative to the effective axis of rotation of the spline of the workpiece. This eccentricity can also be displayed by suitable LCD and/or utilized to provide an indication that a given workpiece is within or outside of a predetermined tolerance, range or limits.

In using the calibrated apparatus, a workpiece 14 is placed on the locator 18. Rotation of the workpiece is initially restrained by frictional engagement of its bottom with the O-ring 134 or by actuating a releasable clamping mechanism. Before cycling of the apparatus is initiated, its component parts are in the position shown in FIG. 1 with the rods of the cylinders 40, 42 and 96 fully retracted, and the gauge 16 rotated to and limit switches 164, 176 and 178 in the positions shown in FIGS. 1 and 2.

Preferably, cycling of the apparatus is initiated by an operator pressing a pair of palm switches (not shown). Through appropriate control circuitry, the gauge 16 is lowered by energizing cylinder 40 to extend its piston rod. This lowers the gauge 16 sufficiently so that it contacts the workpiece and through the lost motion arrangement of the head causes the dog ring 172 to trip the limit switch 164 to indicate that the gauge has contacted the workpiece. Preferably, the control circuits are arranged so that the cycle of the apparatus cannot continue and will be aborted unless this limit switch is tripped within a predetermined period of time after the cylinder 40 is energized. Preferably, to provide a failsafe arrangement in which the gauge 16 cannot be jammed or forced into the workpiece, the maximum stroke of the cylinder 40 and the maximum extent of the lost motion of the head assembly are constructed, arranged and related so that when the cylinder 40 is fully extended and the gauge contacts the workpiece, there is still some additional travel left or unused in the lost motion arrangement of the head.

Usually, the sensing elements of the gauge are not aligned with the grooves of the spline and hence the gauge bears on the top of the workpiece. Even when the gauge sensing elements are aligned with the grooves of the spline, they only slightly enter the grooves and hence there is still lost motion of its head assembly and the limit switch 164 is tripped.

Through appropriate control circuitry, tripping of the limit switch 164 energizes the motor 118 which rotates the gauge so that its sensing elements become aligned with and enter the grooves of the spline of the workpiece. This rotation is usually only a few degrees and is preferably limited to not more than 30° which can be accomplished by a delay relay or timer circuit which de-energizes the motor. To insure that neither the gauge nor the spline is damaged by their rotation after the keys enter the grooves, the amount of torque applied to the gauge is preferably limited by the slip clutch 126. If the workpiece is rigidly clamped in the locator or otherwise positively prevented from rotating, it is necessary to utilize the slip clutch or some other means of limiting the torque applied to the gauge. The gauge is yieldably urged toward the workpiece so that when aligned its elements enter the grooves of the spline due to the weight or mass of the gauge and the carrier shaft 100 to which it is secured. With some gauges or workpieces or where the gauge is reciprocated generally horizontally, it is desirable or even necessary to utilize a spring or some other means of yieldably urging the gauge toward the workpiece.

After the sensing elements of the gauge have been started into the grooves of the spline, they are advanced to the desired location for measuring the spline by energizing the cylinder 42 through appropriate electropneumatic circuitry to advance its piston rod and thereby positively move the gauge toward the workpiece. The elements of the gauge are then firmly engaged with portions of the generally opposed faces of at least some of the teeth of the spline by energizing the cylinder 96 through appropriate electropneumatic circuitry to rotate the carrier ring 70 of the gauge. This both firmly clamps the spline of the workpiece in the gauge and moves the actuator of the LVDT 74 which provides an indication of the size of the spline as determined by engagement of the key elements of the gauge with the teeth of the spline. Preferably, to improve the accuracy of the measurement, the workpiece is disengaged from the locator 18 so that it is carried only by the gauge by energizing through appropriate electropneumatic circuitry one of the cylinders 40 or 42 to at least partially retract its piston rod and thereby raise the gauge 16 as shown in FIG. 6. After the workpiece is disengaged from the locator 18, the signal produced by the gauge LVDT 74 is received, stored and processed by the central processing unit to measure the spline.

If desired, after the spline is measured, the amount of any eccentricity between the cylindrical surface 136 of the workpiece and the effective axis 138 of the spline, can be measured. This is accomplished by receiving, storing and processing in the processing unit, the output signal of the eccentricity LVDT 156 while the workpiece is held by the gauge and rotated through at least one complete revolution. Through appropriate electric circuitry, the motor 118 is energized to rotate the gauge. Preferably, the gauge and workpiece are first returned to a home position, shown in FIG. 2, in which the limit switch 176 is tripped and then rotated in the opposite direction clockwise through a full revolution during which the output of the LVDT 156 is recorded and stored in a memory of the central processing unit. When this clockwise revolution is completed, the cam 200 moves the lever arm 194 and dog 192 to trip the limit switch 178 which through appropriate circuitry stops the motor 118.

The workpiece is released or unclamped from the gauge either before or preferably after it has been deposited on the locator 18. If released before, the workpiece falls or drops onto the locator. With some workpieces, there is a risk, that if released before being deposited, they will become jammed or caught in the gauge when released; and hence, they must be deposited on the locator before being released. The workpiece is deposited before being released by energizing one of the cylinders 40 or 42 through appropriate electropneumatic circuitry to extend its piston rod and thereby lower the gauge to deposit the bottom of the of the workpiece on the O-ring 134 of the fixture. If a clamp or other retaining means is utilized in lieu of the O-ring, it is actuated to engage the workpiece after it is deposited on the locator.

The gauge is released from the workpiece by energizing the cylinder 96 through appropriate electropneumatic circuitry to rotate the carrier ring 70 (clockwise as viewed in FIG. 6) so that its sensing elements 72 are generally axially aligned with the elements 58 and 68 of the gauge (as shown in FIG. 1). Thereafter, the gauge is raised to disengage it from the workpiece by energizing through appropriate electropneumatic circuitry the cylinder 40 to raise the head assembly 28 and the gauge. Either simultaneously or subsequently, the cylinder 42 can also be energized to fully retract its piston thereby return the gauge to its fully raised position. The measured workpiece can then be removed from the locator.

To rotate the gauge 16 back to its home position the motor 118 is energized. When the gauge reaches its home position as shown in FIG. 2, the limit switch 176 is tripped which stops the motor. Another workpiece can be inserted on the locator and the next cycle of the apparatus initiated.

We claim:

1. An apparatus for gauging a spline of a workpiece comprising, a gauge head constructed and arranged to receive a spline gauge having at least two axially spaced elements constructed and arranged to be relatively rotated to a first angular position wherein they are generally aligned and can be inserted in a groove between adjacent teeth of a spline of a workpiece and to a second angular position wherein they bear on a portion of generally opposed faces of adjacent teeth of the spline, a transducer operably associated with the gauge and constructed and arranged to provide an electric signal indicative of the relative angular position of the elements of the gauge, a locator constructed and arranged to receive and locate a workpiece having a spline such that the axis of the spline is generally coaxial with the axis of a gauge carried by the gauge head, a first actuator constructed and arranged to impart relative movement between said gauge head and locator generally axially toward and away from each other, a lost motion means operably associated with at least one of said gauge head and locator and constructed and arranged to yield when said first actuator moves said gauge head and said locator toward each other sufficiently so that the gauge carried by said head bears on the workpiece carried by the locator, the gauge when bearing on the workpiece adjacent an end of the spline being yieldably urged toward the workpiece independently of the said first actuator, a second actuator operatively associated with at least one of said locator and gauge head and constructed and arranged to impart relative rotation therebetween with the gauge bearing on the workpiece and the elements thereof in the first position so that when they become axially aligned with at least some of the grooves between the teeth of the spline they are moved by said yieldable urging at least partially into such grooves, thereafter said first actuator relatively moves said head and locator toward each other to generally axially advance the elements of the gauge fully into such grooves, and a third actuator constructed and arranged to thereafter impart relative rotation between the elements of the gauge to move them to their second position wherein they bear on a portion of generally opposed faces of the teeth of the spline of the workpiece, whereby the transducer provides a signal indicative of a measurement of the spline of the workpiece.

2. The apparatus of claim 1 which also comprises a restrainer constructed and arranged to restrain rotation of the workpiece with the gauge when said second actuator imparts relative rotation between said gauge head and locator with the gauge bearing on the workpiece.

3. The apparatus of claim 1 which also comprises a restrainer associated with said locator and constructed and arranged to restrain rotation of the workpiece with the gauge when the workpiece is received on the locator and release means constructed and arranged to release the workpiece from said restrainer and disengage it from said locator with the elements of the gauge in their second position, whereby the workpiece is carried by only the gauge when the measurement of the spline is made.

4. The apparatus of claim 1 which also comprises release means constructed and arranged to disengage said locator from the workpiece when the elements of the gauge are in their second position, whereby the workpiece is carried by the gauge while the measurement of the spline of the workpiece is made.

5. The apparatus of claim 4 wherein said release means moves said head and locator relatively generally axially away from each other to disengage said locator from the workpiece.

6. The apparatus of claim 1 which also comprises a drive constructed and arranged to rotate the gauge with the elements in their second position and a workpiece carried thereby, a probe constructed and arranged to yieldably bear on a portion of a generally circular surface of the workpiece to move generally radially in response to variations of the generally radial distance between the portion of the surface contacted by the probe and the axis of the spline while the workpiece is rotated by said drive and carried by the gauge, and a transducer operatively associated with said probe and constructed and arranged to produce an electric signal indicative of any eccentricity of such surface with respect to the axis of the spline of the workpiece.

7. The apparatus of claim 6 wherein said probe is carried by said workpiece locator.

8. The apparatus of claim 6 wherein said probe is carried by said locator and constructed and arranged to bear on such surface with the workpiece being rotated by said drive while disengaged from said locator, whereby the measurement of any eccentricity is made while such workpiece is disengaged from said locator.

9. The apparatus of claim 6 which also comprises release means constructed and arranged to disengage said locator from the workpiece with the elements of the gauge in their second position whereby the workpiece is carried by only the gauge while the measurements of the spline and any eccentricity are made.

10. The apparatus of claim 6 wherein said drive rotates the workpiece through at least 360°.

11. A gauging apparatus comprising; a press, a gauge head carried by said press and constructed and arranged to receive a spline gauge having at lest two elements relatively rotatable on a common axis to a first position wherein they can be inserted generally axially into grooves between adjacent teeth of a spline of a workpiece and to a second angularly displaced position wherein they bear on portions of generally opposed side faces of at least some adjacent teeth of the spline, a first drive constructed and arranged to move the elements of the gauge to their first and second positions, a transducer operably associated with the gauge to provide an electric signal indicative of the extent of such angular displacement of the elements to their second positions, a workpiece locator carried by said press and constructed and arranged to receive and locate a workpiece with a spline so that the axis of the spline is generally aligned with the axis of the elements of the gauge carried by the gauge head, a second drive constructed and arranged to move said head and locator relatively generally axially toward and away from each other, a lost motion mount of one of said head and locator to yield generally axially when the gauge and workpiece first become engaged and said second drive continues to move said head and locator relatively toward each other and with said head and locator being yieldably biased toward each other, and a third drive constructed and arranged to impart relative rotation between the gauge and workpiece carried by said head and locator after said second drive has moved said head and locator relatively toward each other to a first position wherein the gauge has contacted the workpiece adjacent an end of the spline and said lost motion mount has yielded at least in part so that the elements of the gauge will become aligned with grooves of the spline and start to enter them, said second drive also being constructed and arranged to thereafter relatively move said head and locator toward each other to a second position wherein the elements of the gauge are advanced axially fully into such grooves, and thereafter said first drive can move such elements of the gauge to their second position, whereby said transducer provides a signal indicative of a measurement of the spline of the workpiece.

12. The apparatus of claim 11 which also comprises control circuitry constructed and arranged to sequentially energize said second drive to move relatively said head and locator to their said first position, energize said third drive to impart relative rotation between the workpiece and gauge, energize said second drive to move relatively said head and locator to their said second position, and to energize said first drive to move the elements of the gauge to their second position.

13. The apparatus of claim 11 which also comprises said locator being constructed and arranged so that it can be disengaged from the workpiece and moved generally axially away therefrom, and wherein said second drive is also constructed and arranged so that with the elements of the gauge in their second position said third drive relatively moves said head and locator to a third position wherein the workpiece is disengaged from said locator and carried by the gauge while the measurement of the spline is made.

14. The apparatus of claim 13 which also comprises control circuitry constructed and arranged to sequentially energize said second drive to move relatively said head and locator to their said first position, energize said third drive to impart relative rotation between the workpiece and gauge, energize said second drive to move relatively said head and locator to their said second position, energize said first drive to move the elements of the gauge to their said second position, and to energize said second drive to move relatively said head and locator to their said third position.

15. The apparatus of claim 11 which also comprises a probe constructed and arranged to yieldably bear on a portion of a surface of the workpiece at least in part encircling the axis of the spline thereof when the workpiece is carried by the gauge with the elements of the gauge in their second position, said third drive also being constructed and arranged to impart relative rotation between said probe and such workpiece while carried by the gauge, and a transducer associated with said probe and constructed and arranged to produce a signal indicative of the generally radial distance between such portion of the surface contacted by said probe and the axis of the spline while said third drive imparts such last mentioned relative rotation between the workpiece and the probe.

16. The apparatus of claim 15 wherein said third drive is constructed and arranged to impart such relative rotation between said probe and the workpiece for at least 360°.

17. The apparatus of claim 15 which also comprises said locator being constructed and arranged so that it can be disengaged from the workpiece and moved relatively generally axially away therefrom, and wherein said second drive is also constructed and arranged so that with the elements of the gauge in their second position said second drive relatively moves said head and locator to a third position wherein the workpiece is disengaged from said locator and carried by the gauge while the measurement of the spline is made.

18. The apparatus of claim 17 which also comprises control circuitry constructed and arranged to sequentially energize said second drive to move relatively said head and locator to their said first position, energize said third drive to impart relative rotation between the workpiece and gauge, energize said second drive to move relatively said head and locator to their said second position, energize said first drive to move the elements of the gauge to their second position, and energize said second drive to move relatively said head and locator to their said third position.

19. The apparatus of claim 11 wherein said lost motion mount comprises a shaft slidably received in a sleeve for generally axial reciprocation therein and said shaft is constructed and arranged to carry the gauge.

20. The apparatus of claim 19 wherein said third drive also comprises a bearing journalling said sleeve for rotation about the axis of said shaft and means connecting said shaft for rotation with said sleeve while permitting said shaft to move generally axially predetermined limits with respect to said sleeve.

21. The apparatus of claim 20 wherein said third drive also comprises a reversible motor drivingly connected with said sleeve for rotation thereof.

22. The apparatus of claim 21 wherein said motor is connected to said sleeve through a slip clutch limiting the maximum torque that can be applied to said sleeve by said motor.

23. The apparatus of claim 11 wherein said second drive comprises at least two fluid cylinders connected together in tandem.

* * * * *